Patented Sept. 21, 1937

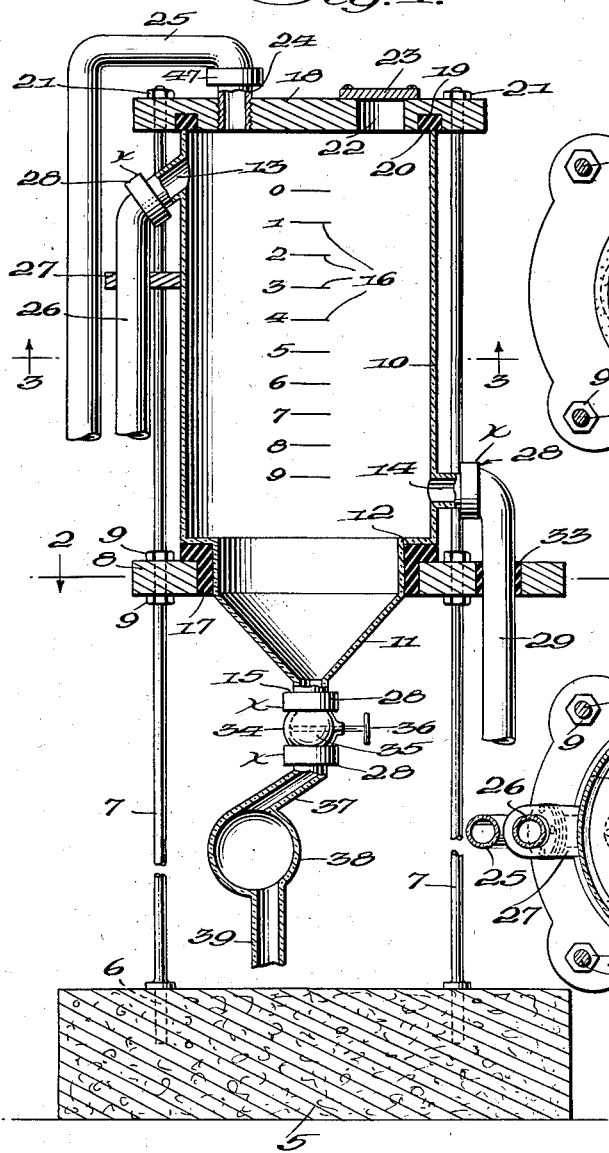

2,093,575

UNITED STATES PATENT OFFICE 2,093,575

VISIBLE MEASURING DEVICE FOR GASOLINE DISPENSING PUMPS

John R. Roberts, Cedartown, Ga.

Application December 24, 1936, Serial No. 117,653

11 Claims. (Cl. 221—100)

This invention relates to new and useful improvements in visible measuring devices for gasoline dispensing pumps.

The primary object of the invention is to provide a visible measuring receptacle into which gasoline, or other fluid commodities, may be fed by a dispensing pump to enable customers to inspect the gasoline as it is being delivered.

A further important object of the invention is to provide a visible catch basin for sediment, or the like, which is formed integrally with the measuring receptacle and which allows a customer to see that the sediment is not being dispensed with the pure gasoline.

Still another object of the invention is to provide a novel form of supporting means for the combined transparent measuring receptacle and sediment collection basin which permits these elements to be made of glass, or other vitreous material, and yet prevents any stresses or strains delivered to the various inlet and outlet connections from being transmitted to the glass measuring receptacle and sediment collection basin.

Another object of the invention is to provide a visible discharge bulb through which sediment may be drained from the collecting basin and whereby a customer may ascertain that no portion of his measured quantity of gasoline is being drawn off from the sediment basin.

Other objects and advantages of the invention will be apparent during the course of the following description.

In the accompanying drawing forming a part of this specification and in which like numerals are employed to designate like parts throughout the same:

Figure 1 is a vertical sectional view of the visible measuring device embodying this invention;

Figure 2 is a transverse sectional view taken on line 2—2 of Figure 1;

Figure 3 is a transverse sectional view taken on line 3—3 of Figure 1; and

Figure 4 is a detail longitudinal sectional view of a form of coupling or detachable connection employed for joining the various inlet and outlet pipes used in the measuring device.

Referring particularly to Figure 1, the reference character 5 designates any suitable form of base in which are embedded the lower ends 6 of a desired number of vertically extending supporting rods 7. At a suitable level above the base 5, a supporting ring 8 is mounted upon the rods 7 and secured against movement relative thereto by the nuts 9. The supporting rods 7 extend vertically above the supporting ring 8 for a purpose to be described at a later point.

A combined measuring receptacle 10 and sediment collecting basin 11, formed of any suitable transparent material such as glass, is provided. The sediment collecting basin 11 is formed of reduced diameter with reference to the measuring receptacle 10 and is stepped inwardly of the periphery of said receptacle to form an angular seat 12. The glass measuring receptacle 10 has formed integrally therewith an overflow nipple 13 which is located adjacent the upper end of the receptacle. Adjacent the lower end of the receptacle 10 but spaced vertically from the seat 12 is an integral nipple 14 employed for drawing off the measured gasoline, or other commodity, to dispense the same to the customer. The sediment collecting basin 11 is of conical or funnel shape and has formed on the apex thereof an integral nipple 15 to be connected to suitable disposal means in a manner to be described at a later point.

The side wall of the measuring receptacle 10 has formed thereon a suitable number of graduation lines 16 which are numbered to indicate different quantities of gasoline which may be dispensed through the service outlet nipple 14.

A ring 17 of angular formation in cross section and formed of rubber or other yielding material is interposed between the ring 8 and the angular seat 12 formed by the receptacle 10 and basin 11 for the purpose of yieldably supporting the receptacle and basin on the ring 8.

The upper open end of the receptacle 10 is closed by a cover plate 18, made of suitable metallic material, or the like. This cover 18 is formed with an annular channel 19 in its lower surface for the reception of a packing and cushioning ring 20 which bears against the upper edge of the receptacle 10 to prevent engagement between this glass receptacle and the metal cover 18. The cover is drawn downwardly toward the receptacle 10 and held in place by nuts 21 threaded on the upper ends of the rods 7. The cover 18 is provided with a clean-out opening 22 which is closed by a plate 23. Removal of the plate 23 enables an operator to gain access to the interior of the receptacle 10 and basin 11 to permit cleaning the same. A nipple 24 is threadedly mounted in a second aperture or opening in the plate 18 and has suitably, detachably connected thereto a supply pipe 25 which leads to a conventional form of gasoline dispensing pump, not shown.

The overflow nipple 13 has coupled thereto, by means of the coupling structure illustrated in detail in Figure 4, a pipe 26 which functions to return the overflow gasoline to the supply tank which is usually buried in the ground. This overflow pipe 26 is suitably supported and braced by the mounting bracket 27 which is supported in any desired manner by the adjacent rods 7. This bracket 27 functions to hold the overflow pipe 26 so that any stresses or strains applied to the same will not be transmitted to the glass nipple 13 formed on the receptacle 10.

The service outlet nipple 14 has coupled thereto, by means of the connector structure 28 which is shown in detail in Figure 4, the service outlet pipe 29. This service outlet pipe is illustrated in Figures 1 and 2 as being clamped to the ring 8 by means of the removable clamp member 30 which is connected to the projecting portion 31 formed on the ring 8 by means of the bolts 32. A rubber bushing 33 is interposed between the service outlet pipe 29 and its supporting clamp elements 31 and 30. This clamp mechanism will function to restrain the pipe 29 sufficiently to prevent stresses and strains delivered to the pipe 29 from being transmitted back to the glass nipple 14 formed on the receptacle 10.

A valve housing 34 is connected to the glass nipple 15 of the sediment basin 11 by means of the coupling 28, shown in detail in Figure 4. This valve housing 34 is provided with a suitable valve plate 35 actuated by means of the handle 36 for controlling discharge from the bottom of the sediment basin 11. A second coupling 28 is employed for connecting the valve housing 34 to the branch 37 of a transparent sediment bulb 38. The second branch 39 of this bulb is adapted to be connected to any suitable disposal or waste pipe, not shown, in any desired manner.

Figure 4 discloses in detail the coupling structure designated in general by the reference character 28 in the several figures. This structure consists of a glass nipple 40 which may be any one of the nipples 13, 14, or 15 or the end of the branch 37 which forms a part of sediment bulb 38. This glass nipple 40 has formed on its periphery or suitably secured thereto at a point located inwardly of the end or extremity of the nipple a flange 41. The pipe 42 to be connected to the nipple 40 is provided with an externally screw-threaded end 43 adapted to receive the extremity of the glass nipple 40. A rubber gasket or ring 44 is interposed between the extremity 43 of the pipe 42 and the peripheral flange 41 carried by the glass nipple 40. A second rubber ring or gasket 45 is applied to the opposite face of the flange 41 carried by the glass nipple 40. A clamping sleeve 46, which may be split axially, is provided with a flange 47 at one end adapted to engage the rubber gasket 45. The remaining end portion of the sleeve 46 is internally screw-threaded for connection with the threaded end 43 of the pipe 42. By threading the sleeve 46 downwardly upon the extremity 43 of the pipe 42, a tight clamping connection will be provided between the glass nipple 40 and the pipe 42.

To assemble this visible measuring device, the various rods 7 are properly anchored in the base 5, after which the ring 8 is properly connected to the rod 7. The supporting or cushioning ring 17 is then applied to the ring 8, and the glass receptacle 10 and basin 11 then may be positioned upon the rubber ring 17. The cover 18 may then be applied to the upper open end of the receptacle 10 and secured in place by the nuts 21 mounted upon the rods 7. After the various pipes 25, 26, and 29 are connected to the nipples 24, 13, and 14 and the sediment discharge bulb 38 coupled to the valve housing 34 with the said housing suitably connected to the nipple 15 formed on the sediment basin 11, the measuring device may be put in operation.

It will be understood that gasoline is fed to the measuring device through the pipe 25. This gasoline will rise in the basin 11 and receptacle 10 until it reaches the desired level, as indicated by the graduation lines 16. If the gasoline level in the receptacle 10 reaches the overflow nipple 13, surplus gasoline will be automatically drawn off through this nipple and its pipe 26. By proper manipulation of a valve interposed in the service outlet pipe 29, not shown, any desired amount of gasoline may be withdrawn from the receptacle 10. Due to the location of the outlet nipple 14 relative to the bottom of the receptacle 10, there will always be maintained a quantity of gasoline in the lower portion of the receptacle 10 and in the sediment basin 11.

It is preferred that the control of the valve in pipe 29 be such that the gasoline will never be drained from the pipe 29. At desired intervals, the valve 35 may be opened to permit sediment to be drawn off from the basin 11 through the visible bulb 38.

It is to be understood that the form of this invention herewith shown and described is to be taken as the preferred example of the same and that various changes in the shape, size, and arrangement of parts may be resorted to without departing from the spirit of the invention or scope of the subjoined claims.

Having thus described the invention, I claim:

1. A visible measuring device for gasoline dispensing pumps, comprising an integral measuring receptacle and sediment collecting basin formed of transparent material, means for supporting said receptacle and basin, a supply inlet yieldably connected to the upper portion of said receptacle, and a service outlet yieldably connected to the receptacle adjacent its lower end but above the point of connection between the receptacle and basin.

2. A visible measuring device for gasoline dispensing pumps, comprising an integral combined measuring receptacle and sediment collecting basin formed of transparent material, means for yieldably supporting said receptacle and basin, a supply inlet connected to the upper portion of said receptacle, and a service outlet connected to the receptacle adjacent its lower end but above the point of connection between the receptacle and basin.

3. A visible measuring device for gasoline dispensing pumps, comprising a combined measuring receptacle and sediment collecting basin formed of transparent material, means for supporting said receptacle and basin, a supply inlet connected to the upper portion of said receptacle, a service outlet connected to the receptacle adjacent its lower end but above the point of connection between the receptacle and basin, and a transparent drain bulb connected to the bottom of the sediment basin.

4. A visible measuring device for gasoline dispensing pumps, comprising a combined measuring receptacle and sediment collecting basin formed of transparent material with the basin of less diameter than and stepped inwardly of the receptacle to form an angular seat, means for supporting the receptacle and basin on a ring having a resilient gasket mounted thereon and received within said angular seat, a supply inlet connected to the upper portion of said receptacle, and a service outlet connected to the receptacle adjacent its lower end but above the point of connection between the receptacle and basin.

5. A visible measuring device for gasoline dispensing pumps, comprising an integral open-topped measuring receptacle and sediment collecting basin formed entirely of transparent material, a ring for supporting said receptacle and basin, a detachable cover for the receptacle, means for supporting said ring and securing the cover on the receptacle, and inlet and outlet connections for said receptacle.

6. A visible measuring device for gasoline dispensing pumps, comprising an open-topped measuring receptacle and sediment collecting basin formed of transparent material, a ring for supporting said receptacle and basin, a detachable cover for the receptacle, means for supporting said ring and securing the cover on the receptacle, a supply inlet connection for the cover, integral service and overflow outlet nipples formed on said receptacle, and an outlet nipple formed integrally with said sediment basin.

7. A visible measuring device for gasoline dispensing pumps, comprising a combined measuring receptacle and sediment collecting basin formed of transparent material, said receptacle and basin being of such relative diameters that they form an angular seat therebetween, means for supporting the receptacle and basin including a ring having a resilient gasket mounted thereon and received within said seat, a supply inlet connected to the upper portion of said receptacle, a service outlet connected to the receptacle adjacent its lower end but above the point of connection between the receptacle and basin, and means carried by the supporting ring for anchoring the service outlet to prevent strains and stresses applied thereto from being transmitted to the receptacle.

8. A visible measuring device for gasoline dispensing pumps, comprising a measuring receptacle and sediment collecting basin formed of transparent material, means for supporting said receptacle and basin, a supply inlet connected to said receptacle, a service outlet connected to the receptacle, and a transparent drain bulb connected to the bottom of the sediment basin.

9. A visible measuring device for gasoline dispensing pumps, comprising a measuring receptacle and sediment collecting basin formed of transparent material with the basin of less diameter than and stepped inwardly of the receptacle to form an angular seat, means for supporting the receptacle and basin on a ring having a resilient gasket mounted thereon and received within said angular seat, a supply inlet connected to said receptacle, and a service outlet connected to the receptacle.

10. A visible measuring device for gasoline dispensing pumps, comprising a base, a plurality of uprights, a supporting ring fixedly mounted on said uprights spaced from the base, a combined open-topped measuring receptacle and sediment collecting basin formed of transparent material mounted on said supporting ring with the said basin projecting through the ring, resilient means interposed between the basin and ring, a cover detachably mounted on the open top of the said receptacle and connected to said uprights, a supply inlet connected to the cover, a service outlet yieldably connected to the receptacle, and means for yieldably securing said outlet to the supporting ring.

11. A visible measuring device for gasoline dispensing pumps, comprising a base, a plurality of uprights, a supporting ring fixedly mounted on said uprights spaced from the base, a combined open-topped measuring receptacle and sediment collecting basin formed of transparent material mounted on said supporting ring with the said basin projecting through the ring, resilient means interposed between the basin and ring, a cover detachably mounted on the open top of the said receptacle and connected to said uprights, a supply inlet connected to the cover, a service outlet yieldably connected to the receptacle, means for yieldably securing said outlet to the supporting ring, an overflow outlet yieldably connected to the receptacle, and a transparent drain bulb connected to the bottom of the sediment basin.

JOHN R. ROBERTS.